US009694895B2

(12) United States Patent
Senibi et al.

(10) Patent No.: US 9,694,895 B2
(45) Date of Patent: Jul. 4, 2017

(54) METHOD OF FORMING A REINFORCED FOAM-FILLED COMPOSITE STRINGER

(71) Applicant: The Boeing Company, Chicago, IL (US)

(72) Inventors: Simon D. Senibi, Covington, WA (US); Barry P. Van West, Bellevue, WA (US); Juan Carlos Guzman, Seattle, WA (US); Douglas A. McCarville, Orting, WA (US); Daniel M. Rotter, Lake Forest Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 291 days.

(21) Appl. No.: 13/920,085

(22) Filed: Jun. 18, 2013

(65) Prior Publication Data

US 2013/0280491 A1 Oct. 24, 2013

Related U.S. Application Data

(62) Division of application No. 12/277,483, filed on Nov. 25, 2008, now Pat. No. 8,540,921.

(51) Int. Cl.
*B64C 1/06* (2006.01)
*B32B 5/18* (2006.01)
(Continued)

(52) U.S. Cl.
CPC .......... *B64C 1/064* (2013.01); *B32B 1/08* (2013.01); *B32B 3/26* (2013.01); *B32B 3/28* (2013.01); *B32B 5/18* (2013.01); *B32B 9/005* (2013.01); *B32B 9/007* (2013.01); *B32B 15/046* (2013.01); *B32B 15/18* (2013.01); *B32B 15/20* (2013.01); *B32B 27/00* (2013.01); *B32B 2266/08* (2013.01); *B32B 2307/558* (2013.01);
(Continued)

(58) Field of Classification Search
None
See application file for complete search history.

(56) References Cited

U.S. PATENT DOCUMENTS 1,987,337 A 1/1935 Hammerling
2,491,418 A 12/1949 Schlesman
(Continued)

FOREIGN PATENT DOCUMENTS

DE 1949209 A1 4/1971
EP 0215698 A2 3/1987
(Continued)

OTHER PUBLICATIONS

Notice of Allowance, dated Jun. 24, 2013, regarding U.S. Appl. No. 12/508,281, 10 pages.
(Continued)

*Primary Examiner* — Chinessa Golden
(74) *Attorney, Agent, or Firm* — Yee & Associates, P.C.

(57) ABSTRACT

A method and apparatus for manufacturing a composite stringer. A composite material and foam are laid up onto a tool in the form of a stringer. The foam has a plurality of structural members within the foam. The plurality of structural members has a number of orientations to resist a number of loads. The composite material, the foam in the form of the stringer, and the plurality of structural members are cured to form the composite stringer.

20 Claims, 6 Drawing Sheets

(51) Int. Cl.
| | |
|---|---|
| *B32B 3/26* | (2006.01) |
| *B32B 3/28* | (2006.01) |
| *B32B 27/00* | (2006.01) |
| *B32B 9/00* | (2006.01) |
| *B32B 15/04* | (2006.01) |
| *B32B 15/18* | (2006.01) |
| *B32B 15/20* | (2006.01) |
| *B32B 1/08* | (2006.01) |

(52) U.S. Cl.
CPC ....... *B32B 2605/18* (2013.01); *Y10T 428/233* (2015.01); *Y10T 428/24504* (2015.01)

(56) References Cited

U.S. PATENT DOCUMENTS

| | | |
|---|---|---|
| 2,561,756 A | 7/1951 | Shook |
| 2,593,714 A | 4/1952 | Robinson |
| 2,630,472 A | 3/1953 | McArthur |
| 3,028,292 A | 4/1962 | Hinds |
| 3,205,288 A | 9/1965 | Bates |
| 3,390,393 A | 6/1968 | Upton |
| 3,421,336 A | 1/1969 | Lichtenberger |
| 3,530,021 A | 9/1970 | Reichl |
| 3,779,487 A | 12/1973 | Ashton et al. |
| 3,963,425 A | 6/1976 | Sambrook |
| 3,979,005 A | 9/1976 | Robinson et al. |
| 4,019,291 A | 4/1977 | Ernst |
| 4,053,667 A | 10/1977 | Smith |
| 4,079,903 A * | 3/1978 | Ashton et al. ............. 244/123.5 |
| 4,197,545 A | 4/1980 | Favaloro et al. |
| 4,510,500 A | 4/1985 | Brune |
| 4,538,780 A | 9/1985 | Roe |
| 4,776,907 A | 10/1988 | Massions et al. |
| 4,789,577 A | 12/1988 | Leone et al. |
| 4,792,493 A | 12/1988 | Bertram et al. |
| 5,170,666 A | 12/1992 | Larsen |
| 5,184,141 A | 2/1993 | Connolly et al. |
| 5,197,697 A | 3/1993 | Lyloc et al. |
| 5,222,166 A | 6/1993 | Weltha |
| 5,242,523 A | 9/1993 | Willden et al. |
| 5,255,880 A | 10/1993 | Lyloc et al. |
| 5,268,392 A | 12/1993 | Bertram |
| 5,271,986 A | 12/1993 | Dublinski et al. |
| 5,332,178 A | 7/1994 | Williams |
| 5,348,601 A | 9/1994 | Ray |
| 5,363,464 A | 11/1994 | Way et al. |
| 5,403,424 A | 4/1995 | Ehrat et al. |
| 5,415,504 A | 5/1995 | Wolf et al. |
| 5,419,139 A | 5/1995 | Blum et al. |
| 5,458,330 A | 10/1995 | Baum |
| 5,527,414 A | 6/1996 | Dublinski et al. |
| 5,624,622 A | 4/1997 | Boyce et al. |
| 5,632,940 A | 5/1997 | Whatley |
| 5,647,658 A | 7/1997 | Ziadi |
| 5,735,486 A * | 4/1998 | Piening et al. ................ 244/124 |
| 5,741,574 A * | 4/1998 | Boyce et al. ................... 428/119 |
| 5,854,336 A | 12/1998 | Divone, Sr. et al. |
| 5,863,635 A | 1/1999 | Childress |
| 5,958,550 A * | 9/1999 | Childress ..................... 428/119 |
| 6,039,832 A | 3/2000 | McCarville |
| 6,116,179 A | 9/2000 | Swinbanks et al. |
| 6,117,376 A | 9/2000 | Merkel |
| 6,159,414 A | 12/2000 | Tunis, III et al. |
| 6,187,411 B1 | 2/2001 | Palmer |
| 6,198,445 B1 | 3/2001 | Alt et al. |
| 6,450,678 B1 | 9/2002 | Bayersdorfer |
| 6,458,309 B1 | 10/2002 | Allen et al. |
| 6,497,190 B1 | 12/2002 | Lewit |
| 6,510,961 B1 | 1/2003 | Head et al. |
| 6,529,127 B2 | 3/2003 | Townsend et al. |
| 6,632,502 B1 | 10/2003 | Allen et al. |
| 6,638,466 B1 | 10/2003 | Abbott |
| 6,653,980 B2 | 11/2003 | Ceccom et al. |
| 6,689,246 B2 | 2/2004 | Hirahara et al. |
| 6,722,611 B1 * | 4/2004 | Wu et al. ...................... 244/126 |
| 6,739,861 B2 | 5/2004 | Cournoyer et al. |
| 6,755,998 B1 | 6/2004 | Reichard et al. |
| 6,781,477 B1 | 8/2004 | Stancil |
| 6,889,937 B2 | 5/2005 | Simpson et al. |
| 6,949,282 B2 | 9/2005 | Obeshaw |
| 6,960,993 B2 | 11/2005 | Mattes et al. |
| 6,963,728 B2 | 11/2005 | Edwards et al. |
| 6,999,857 B1 | 2/2006 | Kasper et al. |
| 7,001,082 B2 | 2/2006 | Morrison |
| 7,018,217 B2 | 3/2006 | Marshall et al. |
| 7,063,763 B2 | 6/2006 | Chapman, Jr. |
| 7,074,474 B2 | 7/2006 | Toi et al. |
| 7,118,370 B2 | 10/2006 | Willden et al. |
| 7,159,822 B2 | 1/2007 | Grantham et al. |
| 7,196,529 B2 | 3/2007 | Burnett et al. |
| 7,205,956 B1 | 4/2007 | Sychaleun et al. |
| 7,207,523 B2 | 4/2007 | Callahan et al. |
| 7,216,832 B2 | 5/2007 | Simpson et al. |
| 7,231,180 B2 | 6/2007 | Benson et al. |
| 7,246,521 B2 | 7/2007 | Kim |
| 7,263,889 B2 | 9/2007 | Kennedy et al. |
| 7,268,517 B2 | 9/2007 | Rahmel et al. |
| 7,276,703 B2 | 10/2007 | Berkcan et al. |
| 7,277,822 B2 | 10/2007 | Blemel |
| 7,281,318 B2 | 10/2007 | Marshall et al. |
| 7,293,737 B2 | 11/2007 | Engwall et al. |
| 7,296,769 B2 | 11/2007 | Hogenson et al. |
| 7,307,431 B2 | 12/2007 | Safai et al. |
| 7,343,265 B2 | 3/2008 | Andarawis et al. |
| 7,349,225 B1 | 3/2008 | Bennett |
| 7,400,253 B2 | 7/2008 | Cohen |
| 7,414,189 B2 | 8/2008 | Griess |
| 7,419,627 B2 | 9/2008 | Sheu et al. |
| 7,513,769 B2 | 4/2009 | Benson et al. |
| 7,642,790 B2 | 1/2010 | Burnett et al. |
| 7,643,068 B2 | 1/2010 | Hyodo |
| 7,646,135 B1 | 1/2010 | Churchill et al. |
| 7,705,725 B2 | 4/2010 | Matsen et al. |
| 7,719,416 B2 | 5/2010 | Arms et al. |
| 7,749,421 B2 | 7/2010 | Callis et al. |
| 7,830,523 B2 | 11/2010 | Bommer et al. |
| 7,830,888 B2 | 11/2010 | Donovan |
| 7,861,969 B2 | 1/2011 | Guzman et al. |
| 7,864,039 B2 | 1/2011 | Georgeson |
| 7,871,040 B2 | 1/2011 | Lee et al. |
| 7,879,276 B2 | 2/2011 | Guzman et al. |
| 7,963,815 B2 | 6/2011 | Mead |
| 7,998,299 B2 | 8/2011 | McCarville et al. |
| 8,022,793 B2 | 9/2011 | Olson et al. |
| 8,022,843 B2 | 9/2011 | Mitchell et al. |
| 8,026,857 B2 | 9/2011 | Bommer |
| 8,042,767 B2 | 10/2011 | Velicki et al. |
| 8,044,812 B2 | 10/2011 | Harres |
| 8,083,182 B2 | 12/2011 | Cacciaguerra |
| 8,094,062 B2 | 1/2012 | Hook |
| 8,098,143 B2 | 1/2012 | Andarawis et al. |
| 8,100,361 B2 | 1/2012 | Grauerholz |
| 8,115,448 B2 | 2/2012 | John |
| 8,128,030 B2 | 3/2012 | Dannenberg |
| 8,154,402 B2 | 4/2012 | Tayrani et al. |
| 8,234,924 B2 | 8/2012 | Saxena et al. |
| 8,274,383 B2 | 9/2012 | Mitchell et al. |
| 8,326,465 B2 | 12/2012 | Rosca et al. |
| 8,377,247 B2 | 2/2013 | Guzman et al. |
| 8,419,402 B2 | 4/2013 | Guzman et al. |
| 8,540,921 B2 | 9/2013 | Senibi et al. |
| 8,617,687 B2 | 12/2013 | McCarville et al. |
| 2001/0017336 A1 | 8/2001 | Hirahara et al. |
| 2002/0011047 A1 | 1/2002 | Obeshaw |
| 2002/0050925 A1 | 5/2002 | Arms et al. |
| 2002/0178992 A1 | 12/2002 | Lewit |
| 2003/0098520 A1 * | 5/2003 | Cournoyer et al. ........... 264/156 |
| 2003/0170441 A1 * | 9/2003 | Boyle ......................... 428/297.4 |
| 2003/0192990 A1 | 10/2003 | Simpson et al. |
| 2003/0216149 A1 | 11/2003 | Edwards et al. |
| 2004/0048582 A1 | 3/2004 | Mattes et al. |
| 2004/0051214 A1 | 3/2004 | Sheu et al. |
| 2004/0150529 A1 | 8/2004 | Benoit et al. |

(56) References Cited

U.S. PATENT DOCUMENTS

| | | |
|---|---|---|
| 2004/0166408 A1 | 8/2004 | Anderson et al. |
| 2005/0003145 A1 | 1/2005 | Toi et al. |
| 2005/0007121 A1 | 1/2005 | Burnett et al. |
| 2005/0056362 A1 | 3/2005 | Benson et al. |
| 2005/0128028 A1 | 6/2005 | Sanchez et al. |
| 2005/0186994 A1 | 8/2005 | Rahmel et al. |
| 2005/0211843 A1 | 9/2005 | Simpson et al. |
| 2005/0213548 A1 | 9/2005 | Benson et al. |
| 2005/0230552 A1 | 10/2005 | Engwall et al. |
| 2005/0259919 A1 | 11/2005 | Aldridge et al. |
| 2006/0145704 A1 | 7/2006 | Burnett et al. |
| 2006/0176379 A1 | 8/2006 | Hyodo |
| 2006/0226287 A1 | 10/2006 | Grantham et al. |
| 2006/0249626 A1* | 11/2006 | Simpson et al. ............ 244/123.1 |
| 2007/0046298 A1 | 3/2007 | Safai et al. |
| 2007/0090294 A1 | 4/2007 | Safai et al. |
| 2007/0109121 A1 | 5/2007 | Cohen et al. |
| 2007/0114422 A1 | 5/2007 | Berkcan et al. |
| 2007/0118335 A1 | 5/2007 | Andarawis et al. |
| 2007/0145638 A9 | 6/2007 | Mead |
| 2007/0151375 A1 | 7/2007 | Kennedy et al. |
| 2007/0176840 A1 | 8/2007 | Pristas et al. |
| 2008/0019698 A1 | 1/2008 | Vogley et al. |
| 2008/0036617 A1 | 2/2008 | Arms et al. |
| 2008/0089087 A1 | 4/2008 | Stoner |
| 2008/0111024 A1 | 5/2008 | Lee et al. |
| 2008/0115954 A1 | 5/2008 | Griess |
| 2008/0157429 A1 | 7/2008 | Callis et al. |
| 2008/0185478 A1 | 8/2008 | Dannenberg |
| 2008/0191706 A1 | 8/2008 | Burnett et al. |
| 2008/0226876 A1 | 9/2008 | Roth |
| 2008/0290214 A1 | 11/2008 | Guzman et al. |
| 2009/0057487 A1 | 3/2009 | Velicki et al. |
| 2009/0058361 A1 | 3/2009 | John |
| 2009/0101756 A1 | 4/2009 | Cacciaguerra |
| 2009/0108211 A1 | 4/2009 | Bommer et al. |
| 2009/0127393 A1 | 5/2009 | Guzman et al. |
| 2009/0184877 A1 | 7/2009 | Bommer |
| 2009/0243895 A1 | 10/2009 | Mitchell et al. |
| 2009/0325628 A1 | 12/2009 | Becker |
| 2010/0011865 A1 | 1/2010 | Saxena et al. |
| 2010/0080941 A1 | 4/2010 | McCarville et al. |
| 2010/0090881 A1 | 4/2010 | Hoeoek |
| 2010/0114383 A1 | 5/2010 | Rosca et al. |
| 2010/0129589 A1 | 5/2010 | Senibi et al. |
| 2010/0141377 A1 | 6/2010 | Andarawis et al. |
| 2010/0148003 A1 | 6/2010 | Verweyen |
| 2010/0176939 A1 | 7/2010 | Harres |
| 2010/0231382 A1 | 9/2010 | Tayrani et al. |
| 2010/0318243 A1 | 12/2010 | Lewis et al. |
| 2011/0018686 A1 | 1/2011 | Fahley et al. |
| 2011/0027526 A1 | 2/2011 | McCarville et al. |
| 2011/0049935 A1 | 3/2011 | Locher et al. |
| 2011/0076461 A1 | 3/2011 | Jacob et al. |
| 2011/0080057 A1 | 4/2011 | Bowman et al. |
| 2011/0088833 A1 | 4/2011 | Guzman et al. |
| 2011/0111183 A1 | 5/2011 | Guzman et al. |
| 2011/0139932 A1 | 6/2011 | Matheson et al. |
| 2011/0188862 A1 | 8/2011 | Fuss et al. |
| 2011/0250384 A1 | 10/2011 | Sumi et al. |
| 2011/0254267 A1 | 10/2011 | Marengo |
| 2012/0175464 A1 | 7/2012 | Brownjohn et al. |

FOREIGN PATENT DOCUMENTS

| | | |
|---|---|---|
| GB | 1522432 A | 8/1978 |
| JP | 4329125 A | 11/1992 |
| JP | 2005291708 A | 10/2005 |
| WO | WO8601039 A1 | 2/1986 |
| WO | WO2004102056 A2 | 11/2004 |
| WO | WO2005096571 A1 | 10/2005 |
| WO | WO2005105402 A1 | 11/2005 |
| WO | WO2007041256 A2 | 4/2007 |
| WO | WO2008010841 A1 | 1/2008 |
| WO | WO2008076020 A1 | 6/2008 |
| WO | WO2009023346 A2 | 2/2009 |
| WO | WO2009055218 A2 | 4/2009 |
| WO | WO2010040004 A1 | 4/2010 |
| WO | WO2010065330 A1 | 6/2010 |
| WO | WO2010144248 A1 | 12/2010 |
| WO | WO2011011110 A1 | 1/2011 |
| WO | WO2011016931 A2 | 2/2011 |

OTHER PUBLICATIONS

Notice of Allowance, dated Aug. 20, 2013, regarding U.S. Appl. No. 12/534,356, 20 pages.

International Search Report, dated Apr. 23, 2009, regarding Application No. PCT/US2008/064427 (WO2009023346), 3 pages.

International Search Report, dated Jun. 16, 2009, regarding Application No. PCT/US2008/078438 (WO2009055218), 6 pages.

International Search Report and Written Opinion, dated Mar. 8, 2010, regarding Application No. PCT/US2009/065195 (WO2010065330), 13 pages.

EPO Search Report dated Jul. 15, 2011 regarding application No. 09756924.8-2124 (PCT/US2009/065195), applicant The Boeing Company, 8 pages.

International Search Report and Written Opinion, dated Nov. 18, 2010, regarding Application No. PCT/US2010/036082 (WO2010144248), 15 pages.

International Search Report and Written Opinion, dated Jan. 3, 2011, regarding Application No. PCT/US2010/036130 (WO2011011110), 16 pages.

International Search Report and Written Opinion, dated Feb. 17, 2011, regarding Application No. PCT/US2010/040668 (WO2011016931), 11 pages.

Abbasi et al., "Microwave Nondestruction Detection of Longitudinal Cracks in Pipe with U-bend and Prediction of its Locatin by Signal Processing," In: Electromagnetic Nondestructive Evaluation (XI), Tamburrino et al. (Eds.), IOS Press, Oct. 2008, pp. 154-161. (abstract only).

Caspers et al., "Waveguide Mode Reflectometry for Obstacle Detection in the LHC Beam Pipe Including Signal Attenuation," Proceedings of the 2003 Particle Accelerator Conference (PAC 2003), vol. 4, May 2003, pp. 2700-2702.

"Communication and Power through Structural Airframe Stringers for On-board Wireless Sensors", 10 pages. Retrieved Jun. 18, 2009 from: https://sql-pw-01.nw.nos.boeing.com/structures/StratProjects/bp1__12__18__08/BTEC2009WirelessBusDraft12.17.08.pdf.

Greenhalgh et al., "The Assessment of Novel Materials and Processes for the Impact Tolerant Design of Stiffened Composite Aerospace Structures", Composites Part A: Applied Science and Manufacturing, vol. 34, No. 2, Feb. 2003, pp. 151-161.

Hatfield et al., "Electromagnetic Reverberation Characteristics of a Large Transport Aircraft", Naval Surface Warfare Center Dahlgren Division, NSWCDD/TR-93/339, Jul. 1994, 95 pages.

Hill et al., "Aperture Excitation of Electrically Large, Lossy Cavities", IEEE Transactions on Electromagnetic Compatibility, vol. 36, No. 3, Aug. 1994, pp. 169-178.

Hladio et al., "A passive wireless displacement sensor for structural health monitoring of civil structures," SPIE Proceedings vol. 6531, Apr. 2007, pp. 653114.1-653114.7. (abstract only).

Waller, "How about this? Avionics would go in plane's skin", Electronics, vol. 60, No. 21, Oct. 1987, pp. 39 & 42.

Ko, "The future of sensor and actuator systems", Sensors and Actuators, vol. 56, No. 1, Aug. 1, 1996, pp. 193-197.

Marasco et al., "Mechanical properties balance in novel Z-pinned sandwich panels: Out-of-Plane properties", Composites Part A: Applied Science and Manufacturing, vol. 37, No. 2, Feb. 2006, pp. 295-302.

O'Brien et al., "Assessment of Composite Delamination Self-Healing via Micro-Encapsulation", Proceedings of American Society for Composites 23rd Technical Conference, Sep. 2008, 18 pages.

Partridge et al., "Manufacture and Performance of Z-Pinned Composites," In: Advance Polymeric Materials: Structure Property Relationships, CRC Press, Apr. 2003, pp. 98-137.

(56) References Cited

OTHER PUBLICATIONS

Seibert et al., "Applications for PMI foams in aerospace sandwich structures", Reinforced Plastics, vol. 50, No. 1, Jan. 2006, pp. 44-48.
Shibata et al., "Experimental study on NDT method using electromagnetic waves," Journal of Materials Processing Technology, vol. 161, No. 1-2, Apr. 2005, pp. 348-352. (abstract only).
Office Action, dated Mar. 31, 2010, regarding U.S. Appl. No. 11/753,482, 20 pages.
Final Office Action, dated Jul. 19, 2010, regarding U.S. Appl. No. 11/753,482, 14 pages.
Notice of Allowance, Office Action, dated Sep. 7, 2010, regarding U.S. Appl. No. 11/753,482, 9 pages.
Office Action, dated May 10, 2012, regarding U.S. Appl. No. 12/976,070, 31 pages.
Notice of Allowance, dated Oct. 15, 2012, regarding U.S. Appl. No. 12/976,070, 19 pages.
Office Action, dated Dec. 30, 2009, regarding U.S. Appl. No. 11/937,006, 18 pages.
Final Office Action, dated Jun. 22, 2010, regarding U.S. Appl. No. 11/937,006, 16 pages.
Notice of Allowance, Office Action, dated Oct. 6, 2010, regarding U.S. Appl. No. 11/937,006, 8 pages.
Office Action, dated Oct. 31, 2011, regarding U.S. Appl. No. 13/005,786, 26 pages.
Final Office Action, dated Jul. 13, 2012, regarding U.S. Appl. No. 13/005,786, 7 pages.
Notice of Allowance, dated Feb. 1, 2013, regarding U.S. Appl. No. 13/005,786, 22 pages.
Office Action, dated Feb. 23, 2010, regarding U.S. Appl. No. 11/925,622, 19 pages.
Notice of Allowance, dated Jul. 12, 2010, regarding U.S. Appl. No. 11/925,622, 6 pages.
Office Action, dated Jul. 9, 2010, regarding U.S. Appl. No. 12/016,018, 6 pages.
Office Action, dated Jan. 4, 2011, regarding U.S. Appl. No. 12/016,018, 9 pages.
Notice of Allowance, dated Jun. 27, 2011, regarding U.S. Appl. No. 12/016,018, 7 pages.
Office Action, dated May 17, 2012, regarding U.S. Appl. No. 12/484,151, 38 pages.
Office Action, dated Dec. 13, 2012, regarding U.S. Appl. No. 12/484,151, 32 pages.
Notice of Allowance, dated Apr. 2, 2013, regarding U.S. Appl. No. 12/484,151, 27 pages.
Office Action, dated Nov. 10, 2011, regarding U.S. Appl. No. 12/508,281, 46 pages.
Final Office Action, dated May 9, 2012, regarding U.S. Appl. No. 12/508,281, 43 pages.
Office Action, dated Nov. 7, 2012, regarding U.S. Appl. No. 12/508,281, 26 pages.
Office Action, dated Mar. 1, 2013, regarding U.S. Appl. No. 12/508,281, 28 pages.
Office Action, dated Jun. 7, 2012, regarding U.S. Appl. No. 12/534,356, 34 pages.
Final Office Action, dated Oct. 26, 2012, regarding U.S. Appl. No. 12/534,356, 28 pages.
Office Action, dated Apr. 19, 2012, regarding U.S. Appl. No. 12/534,356, 18 pages.
Canadian Office Action mailed Mar. 23, 2015, 3 pages.
Final Office Action, dated Jan. 25, 2016, regarding U.S. Appl. No. 14/144,429, 13 pages.
Office Action, dated Sep. 8, 2015, regarding U.S. Appl. No. 14/144,429, 50 pages.
Office Action, dated May 31, 2011, regarding U.S. Appl. No. 12/277,483, 34 pages.
Final Office Action, dated Nov. 2, 2011, regarding U.S. Appl. No. 12/277,483, 12 pages.
Office Action, dated Feb. 24, 2012, regarding U.S. Appl. No. 12/277,483, 19 pages.
Final Office Action, dated Aug. 6, 2012, regarding U.S. Appl. No. 12/277,483, 14 pages.
Notice of Allowance, dated Nov. 7, 2012, regarding U.S. Appl. No. 12/277,483, 7 pages.
Notice of Allowance, dated Feb. 25, 2013, regarding U.S. Appl. No. 12/277,483, 20 pages.
European Patent Office Communication, dated Apr. 27, 2015, regarding Application No. EP10730949.4, 3 pages.

\* cited by examiner

METHOD OF FORMING A REINFORCED FOAM-FILLED COMPOSITE STRINGER

This application is a divisional of application Ser. No. 12/277,483, filed Nov. 25, 2008, status pending.

BACKGROUND INFORMATION

1. Field

The present disclosure relates generally to aircraft parts and, in particular, to aircraft stringers. Still more particularly, the present disclosure relates to a method and apparatus for a composite stringer.

2. Background

Aircraft generally include an airframe, which may be regarded as an underlying skeleton to which skin panels are attached to form a smooth aerodynamic outer surface. The wings also include an underlying structure covered with skin panels. Typically, skin panels are light and thin to minimize the weight of the aircraft and increase its payload and range. Since skin panels are thin, they are generally flexible and require stiffening to prevent undesired movement, flexing, and vibration during flight.

Eat stringers have been used for decades in the aerospace industry for stiffening metal fuselage sections and metal wing skins on both commercial and military aircraft. These stringers are composed of thin metal panels with acute angles that result in a trapezoidal shape, rectangular shape, semi-circular shape, or some other suitable shape. Relatively simple metal-forming techniques are used to bend the metal into the acute angles required for this shape. These metal-forming techniques include brake forming or rolling the metal into the hat stringer shape. These techniques allow the production of hat stringers with tight, constant angular bends and straight or flat legs.

In manufacturing composite hat stringers, a hat stringer may be placed on a fuselage skin in which the interior of the hat stringer has a hollow section that is formed with a bladder. These bladders are inserted into the composite stringer prior to performing curing processes. A curing process is a process that toughens or hardens a polymer material in the composite stringer. These bladders are inflated to support the internal structure of the composite stringer during the curing process in an oven or autoclave.

One drawback with the use of bladders is that, in some cases, a bladder may deflate inside of a composite stringer during the curing process. This deflation may result in an improperly formed composite stringer that may not work properly. As a result, the composite stringer is discarded and a new stringer is manufactured. The problems that may occur with deflation of a bladder during curing of a composite stringer include, for example, an improper shape for the stringer, ply movement, ply wrinkling, or porosity.

Therefore, it would be advantageous to have a method and apparatus that overcomes the above-described problems.

SUMMARY

In one advantageous embodiment, a method is present for manufacturing a composite stringer. A composite material and foam are laid up onto a tool in the form of a stringer. The foam has a plurality of structural members within the foam. The plurality of structural members has a number of orientations to resist a number of loads. The composite material, the foam in the form of the stringer, and the plurality of structural members are cured to form the composite stringer.

In another advantageous embodiment, a method is present for forming a composite part. A foam core having a plurality of structural members is formed. The plurality of structural members has a number of orientations to resist a number of loads. The composite part is formed with a channel in which the foam core is located.

In yet another advantageous embodiment, a method is present for manufacturing a plurality of composite stringers. Composite material and foam is laid up with a plurality of structural members within the foam onto a plurality of tools to form a plurality of composite stringers. The plurality of structural members has a number of orientations to resist a number of loads. The plurality of composite stringers is placed on a single tool. A skin ply is placed over the plurality of composite stringers to form a structure, and the structure is cured.

In yet another advantageous embodiment, an apparatus comprises a composite part having a channel, foam, and a plurality of structural members. The plurality of structural members has a number of orientations to resist a number of loads.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
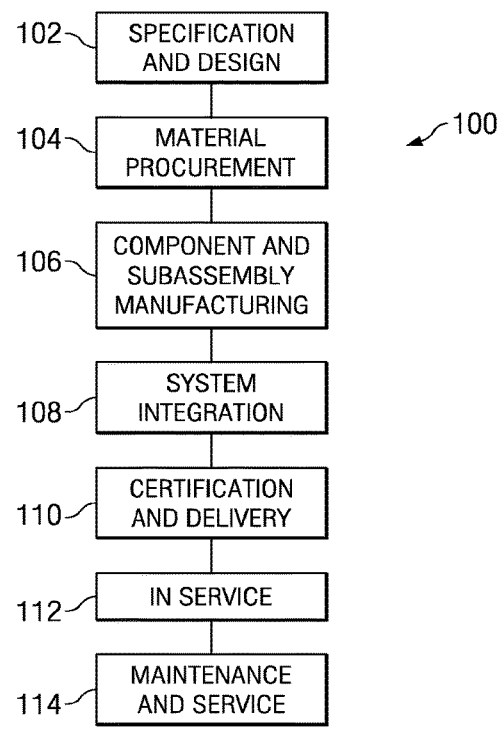
FIG. 1 is a diagram illustrating an aircraft manufacturing and service method in accordance with an advantageous embodiment.
Figure 2:
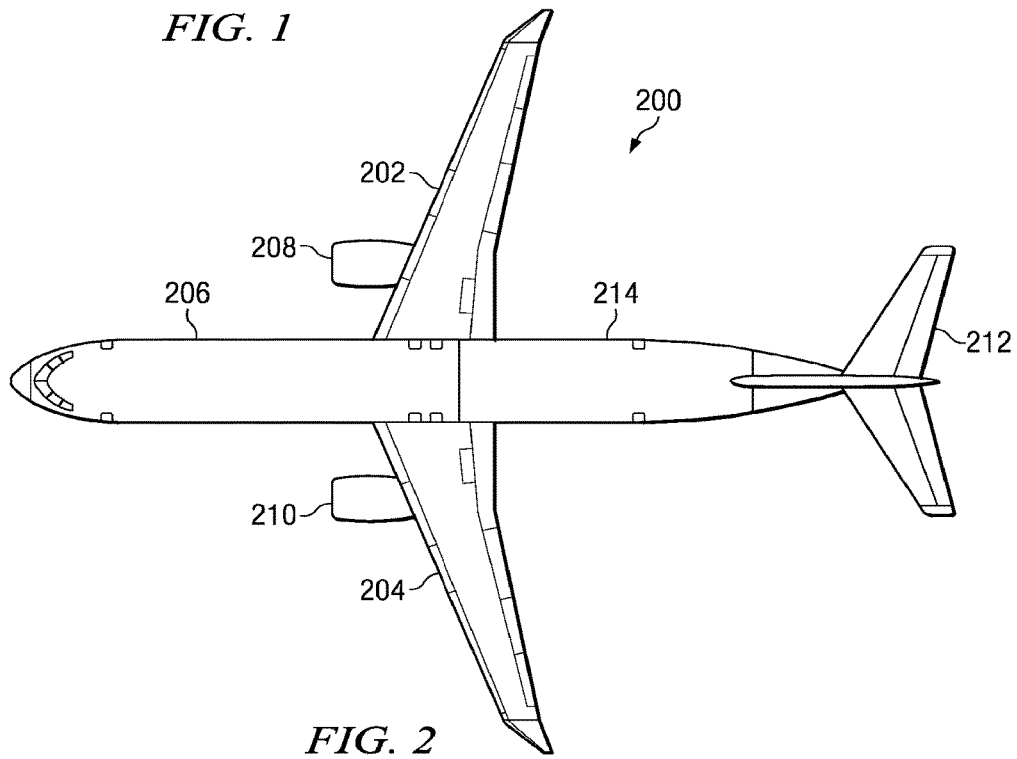
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference next to FIG. 2, a diagram of an aircraft is depicted in which an advantageous embodiment may be implemented. In this example, aircraft 200 is produced by aircraft manufacturing and service method 100 in FIG. 1. Aircraft 200 has wings 202 and 204 attached to fuselage 206. Aircraft 200 also has engine 208, engine 210, and tail 212. Section 214 is an example of a section of fuselage 206 in which an advantageous embodiment may be implemented.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize that other materials may be used in place of an inflatable bladder to form a cavity or channel within a composite part.

The advantageous embodiments recognize that hard tools may be used to form a composite stringer. These hard tools may be made from materials such as, for example, silicone rubber or machined aluminum. The different advantageous embodiments, however, realize that in various components such as fuselage barrels, wing skins, and door panels, the shape of the composite stringers may have complex contours making these types of tooling options difficult or impossible to remove for long panels to form a hollow composite stringer. A long panel may be, for example, a panel that is around 50 feet to around 100 feet long.

The different advantageous embodiments recognize that an alternative material that may be used is foam in place of hard tools to help shape the composite stringer. Further, this type of material may remain in the stringer as part of the structure. Foam filled composite stringers have numerous advantages over conventional hollow composite stringers. These advantages include, for example, increased impact resistance, improved structural properties, acoustical deadening, moisture infiltration reduction, simplified fabrication, reduced handling needs, elimination of a need for noodles (radius support fillers) or wrap plies, reduced tendency to bow out when placed over padups, and flow time reductions.

The different advantageous embodiments also recognize that current stringers with foam may be impractical. The different advantageous embodiments recognize that selecting a foam with a high enough compressible strength to avoid an improper shape for a composite stringer may require foam having higher weight than desired. The different advantageous embodiments also recognize that a thicker wall for the stringer also may be used. This solution also may increase the weight of the composite stringer. Thus, the different advantageous embodiments recognize that it would be advantageous to have a method and apparatus for manufacturing a composite stringer filled with foam in a manner that reduces the weight of the composite stringer.

The different advantageous embodiments provide a method and apparatus for manufacturing a composite stringer. A composite material and foam is laid up onto a tool in the form of a stringer. The foam has a plurality of structural members located within the foam. The plurality of structural members has a number of orientations to resist a number of loads generated by the composite material. A number, as used herein, refers to one or more items. For example, a number of orientations is one or more orientations. The composite material, the foam in the form of the stringer, and the plurality of structural members are cured to form the composite stringer.

Figure 3:
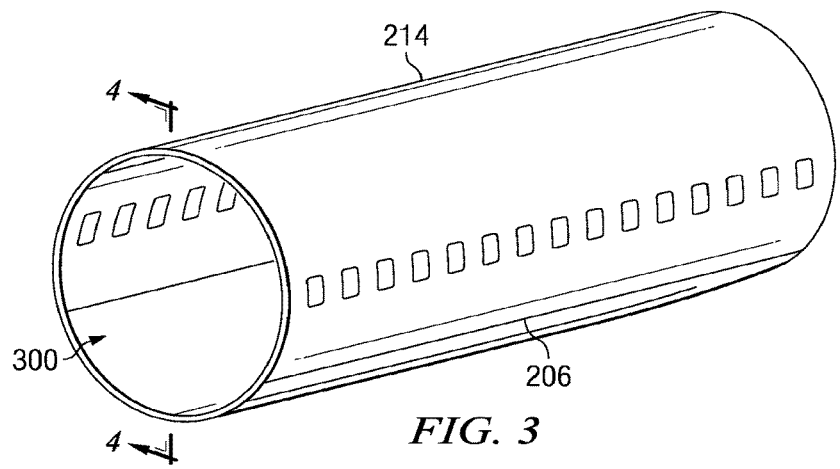
FIG. 3 is a diagram of a portion of a fuselage in accordance with an advantageous embodiment.

With reference now to FIG. 3, a diagram of a portion of a fuselage is depicted in accordance with an advantageous embodiment. In this example, section 214 of fuselage 206 may employ composite stringers to stiffen skin panels 300 within section 214 of fuselage 206.

Figure 4:
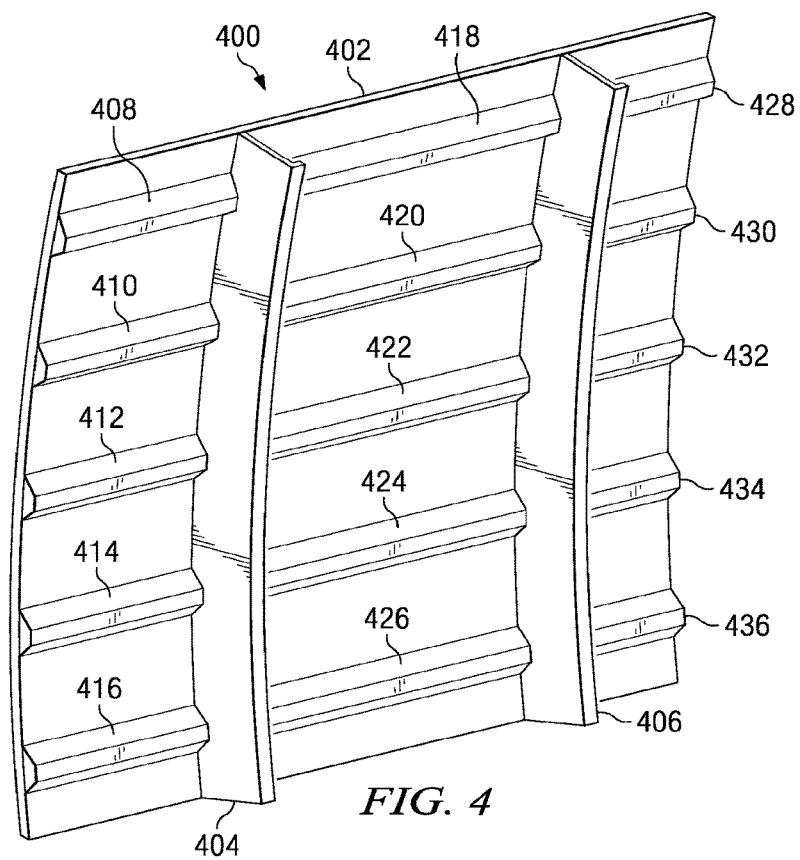
FIG. 4 is a portion of a fuselage section in accordance with an advantageous embodiment.

With reference now to FIG. 4, a portion of a fuselage section is depicted in accordance with an advantageous embodiment. In this example, section 400 is a cross section of fuselage section 214 taken along lines 4-4 from FIG. 3. One or more skin panels may be assembled to form a skin of a structure. As can be seen in this view, section 400 has fuselage skin 402 on frame members 404 and 406. Fuselage skin 402 may be stiffened through the use of stringers 408, 410, 412, 414, 416, 418, 420, 422, 424, 426, 428, 430, 432, 434, and 436.

Figure 5:
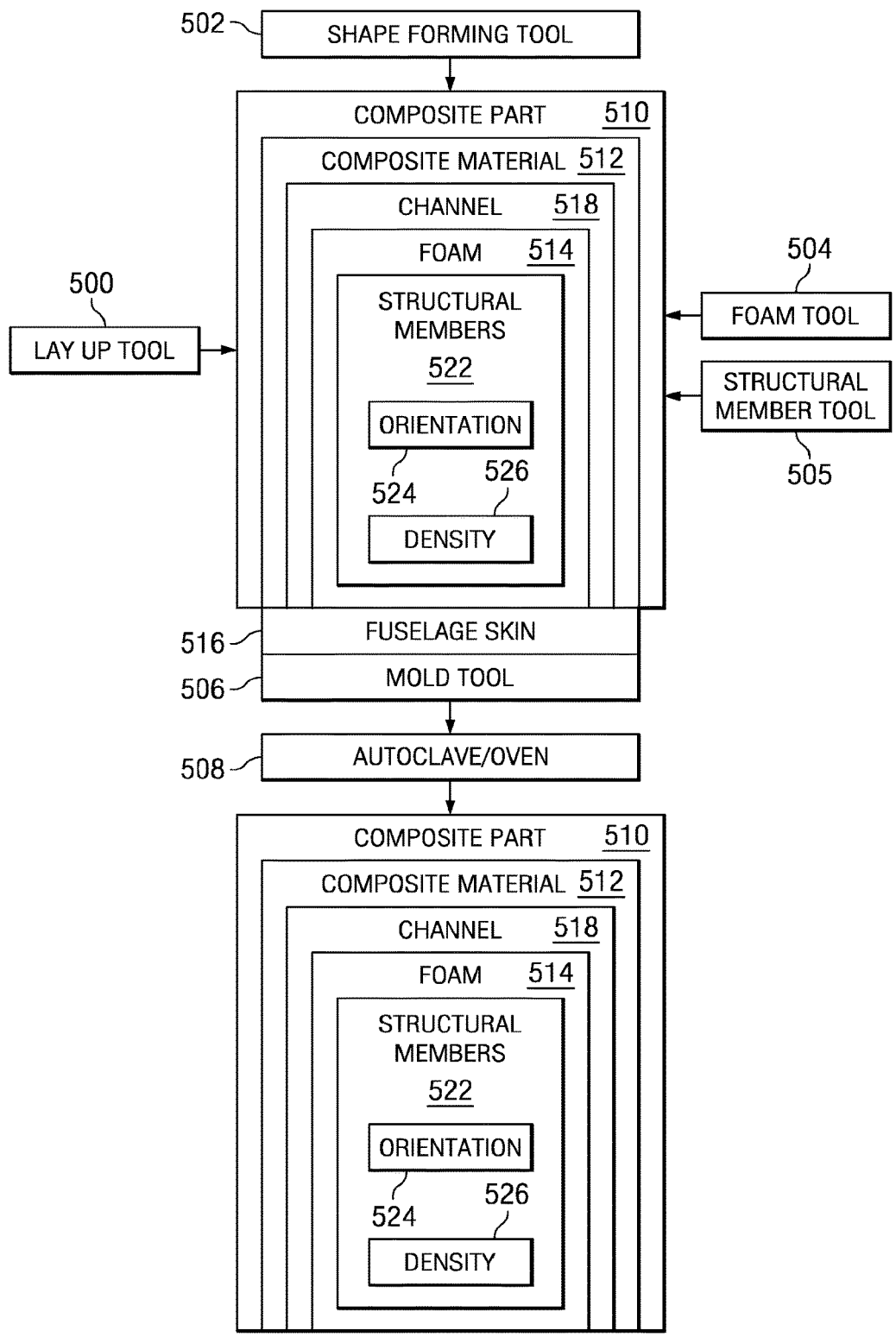
FIG. 5 is a diagram illustrating components used to manufacture a foam stiffened composite stringer in accordance with an advantageous embodiment.

With reference now to FIG. 5, a diagram illustrating components used to manufacture a foam stiffened composite stringer is depicted in accordance with an advantageous embodiment. In these examples, lay up tool 500, shape forming tool 502, foam tool 504, structural member tool 505, mold tool 506, and autoclave/oven 508 are used in these examples to manufacture composite part 510.

Composite part 510 may be a stringer, such as those illustrated in FIG. 4. The illustrative examples for the different advantageous embodiments described herein are directed towards a composite part in the form of a stringer. Of course, the different advantageous embodiments may be employed with other types of composite parts other than stringers. The different advantageous embodiments may be applied to composite parts such as, for example, without limitation, a truss structure, a fluted structure, a hatch structure, a beaded core structure, and/or other suitable structures.

Composite material 512 and foam 514 are formed on fuselage skin 516 in these examples. Composite material 512 has channel 518 in which foam 514 is located. Channel 518 may extend all the way through composite part 510, from one end of composite part 510 to another end of composite part 510. In other embodiments, channel 518 may only extend partially through composite part 510. Structural members 522 are located within foam 514 and may resist a number of loads generated by composite material 512.

Composite material 512 may be processed using lay up tool 500 and shape forming tool 502. Lay up tool 500 is used in this example to stack or lay up plies of composite material 512 into a layer for composite part 510. The layer may also be referred to as a flat charge. The flat charge is processed by shape forming tool 502 to form the desired shape for composite part 510. In these examples, composite part 510 is a composite stringer with a hat shape.

Lay up tool 500 may be implemented using various composite material processing tools such as, for example, an M.Torres Lay up, which is a tape layer machine available from M.Torres. Another example of a machine that may be used for lay up tool 500 is Access-Atlas, which is a composite working machine, which is available from Forest-Line. Shape forming tool 502 may be implemented using a machine or tool that is capable of forming composite material into the desired shape. A forming die or press may be used to implement shape forming tool 502. An example of a press that may be used is a composite spar drape forming machine.

Foam 514 is a foam core located within channel 518. Foam 514 is formed by foam tool 504 in these examples. In these examples, foam 514 may be made from various materials. Foam 514 also is referred to as a polymer or cellular polymer foam. Foam 514 may be manufactured from a two-phased mixture in which gases, bubbles, or cells are disbursed within a solid polymeric resin. These bubbles or cells may be created through chemical additives. For example, a gas may be created by polymerization reaction or thermal decomposition. These cells also may be created within the resin through physical blowing agents, such as inert gases. Cells created in this manner may be open and loosely interconnected or closed and detached.

When a higher percentage of closed cells are present in a foam, the density of the foam is higher as well as the weight. In these examples, foam 514 may be made through a number of different methods including, for example, combining blowing agents in liquid resin and then curing the mixture in a mold, through extrusion, compression or injection molding, or solid-state fabrication.

Foam 514 may be implemented with any foam that can remain intact during a curing process. Examples of foams that may be used for foam 514 include, for example, without limitation, Last-A-Foam containing polyisocyanurate, which is available from General Plastics; Aircell containing aromatic polyester, which is available from Polyumac; Performa-H containing polyimide which is available from GFT Corporation; Corecell containing styrene acrylo-nitrile, which is available from Gurit; RIMA containing polymethacryllmide, which is available from Degussa/Rohacell; Airex containing polyetherimide, which is available from Alcan/Baltek; PrimoSpire/Parmax containing polyphenylenes, which is available from Solvay/Mississippi Poly Tech; LCP containing polyetherether-ketone, which is available from Wright Materials Research Company; Zotek containing polyvinylidene fluoride, which is available from ZoteFoams; Elfoam containing polyisocyanurate, which is available from Elliott Company; and Divinycell HT containing poly vinyl chloride, which is available from Diab.

Foam 514 may be formed with structural members 522 in place or structural members 522 being inserted into foam 514 afterwards. Foam tool 504 may be implemented using any machine that is capable of forming foam 514. An example of a machine that may be used to implemented foam tool 504 is a TVZ series machine, such as TVZ 4P, manufactured by Teubert.

Structural members 522 may be any component that is capable of providing reinforcement to resist loads generated by composite material 512 during the curing process within autoclave/oven 508. Structural members 522 may comprise at least one of a number of pins, a number of tubes, a number of rods, and a number of any other suitable structural members. The number of tubes and the number of rods may be any shape such as, for example, rectangular, square, circular, triangular, or some other suitable shape. Further, these structural members may be hollow or solid.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C. In other words, one or more of each type of structural member may be used in some advantageous embodiments rather than only using a single type of structural member.

Structural member tool 505 may be used to insert structural members 522 into foam 514. For example, when structural members 522 take the form of pins, structural member tool 505 may be a press with ultrasonic vibration. Of course, other types of tools may be used depending on the particular type of structural member. Examples of presses that may be used include the Sureweld 20, Sureweld 35, and Sureweld 70 models made by Sonobond Ultrasonics, Inc., as well as the 2000× series models made by Branson Ultrasonics Corporation, that may be mounted on a three-axis gantry.

Further, structural members 522 are selected from materials that may be capable of resisting a compressive load applied onto composite part 510 without allowing foam 514 to collapse. Structural members 522 may be constructed from various materials. For example, the material may be aluminum, steel, carbon, titanium, a metal alloy, a ceramic material, or some other suitable material.

In these examples, structural members 522 have parameters such as orientation 524 and density 526. Orientation 524 is the orientation of each structural member within structural members 522. Orientation 524 may have one or more orientations depending on the particular implementation. In these examples, orientation 524 may be oriented to resist applied loads to composite part 510 during the curing process that may otherwise cause a collapse of foam 514 within composite material 512.

Orientation 524 also may be selected to resist loads that may be applied to composite part 510 in use. These orientations may be described by angles with respect to a particular surface of composite part 510. Density 526 is the number of structural members 522 located in an area. The densities may vary depending on the particular design. Further, the density may be uniform within foam 514 or may be non-uniform. For example, an area within foam 514 may have a higher density of structural members 522 if a higher load may be anticipated for that particular area.

Composite part 510 on fuselage skin 516 and mold tool 506 are placed into autoclave/oven 508 to perform a curing process. Mold tool 506 may be, for example, an inside mold line tool or an outside mold line tool, depending on the implementation. The temperatures in autoclave/oven 508 may be around 350 degrees Fahrenheit.

Additionally, autoclave/oven 508 also may introduce pressure in performing the curing process for composite part 510. The pressure may be, for example, around 100 pounds per square inch. The heating causes polymer materials, such as resins, in composite material 512 to flow. When polymers harden, composite part 510 is considered to be cured in these examples. The use of structural members 522 may prevent foam 514 from collapsing within composite part 510 during the curing process. Structural members 522 also may aid foam 514 in resisting compressive loads that may be applied during the curing process.

Autoclave/oven 508 may be implemented using any autoclave/oven or machine that is capable of curing composite components. An Anchor autoclave from Anchor Autoclave Systems, and an autoclave available from Taricco Corporation are examples of autoclaves that may be used to implement autoclave/oven 508. Composite part 510 also may be cured using other mechanisms other than autoclave/oven 508 in other embodiments. For example, electron beam curing may be used to cure composite material 512.

After curing has occurred, composite part 510 is removed from autoclave/oven 508. In these examples, foam 514 may provide features and advantages as described above with respect to having foam located inside composite part 510. Composite part 510 may provide a number of different features in addition to a lighter weight as compared to composite parts created with currently used methods. For example, composite part 510 also may act as a noise attenuator and/or structural vibration dampener.

Further, composite part 510 also may provide increased structural stabilization. For example, buckling and crippling may be less likely to occur with composite part 510. Further, composite part 510 also may block the ingress of liquids into composite part 510. The use of structural members 522 may provide greater resistance to compressive forces that may be applied to composite part 510 in use.

The illustration of the components used to manufacture a composite stringer with a foam core is not meant to imply physical or architectural limitations to the manner in which composite parts with foam cores may be manufactured. Other advantageous embodiments may include other components in addition to or in place of the ones illustrated in these examples. For example, the different tools illustrated may be computer controlled tools connected to a computer or network.

Figure 6:
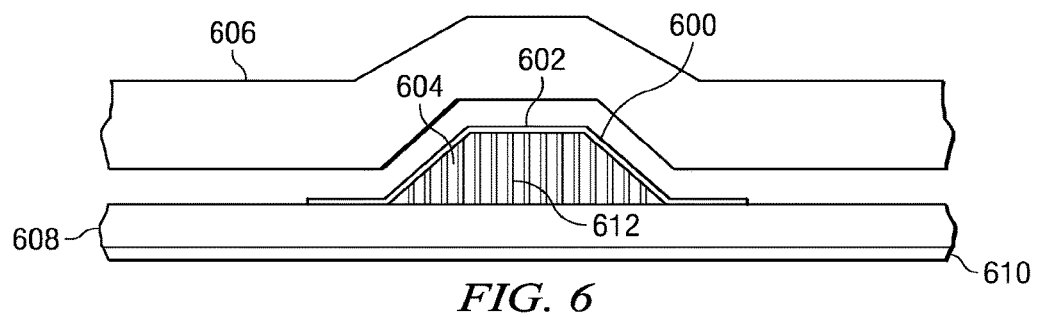
FIG. 6 is a diagram illustrating an example lay up of composite materials on an inside mold line tool for a composite stringer in accordance with an advantageous embodiment.

Turning now to FIG. 6, a diagram illustrating an example lay up of composite materials on an inside mold line tool for a composite stringer is depicted in accordance with an advantageous embodiment. In this example, composite stringer 600 includes composite material 602 and foam 604. Composite material 602 is laid up over foam 604. Foam 604 is placed into inside mold line tool 606. Then fuselage skin 608 is placed or laid up onto composite material 602, foam 604, and inside mold line tool 606. Caul 610 is placed against fuselage skin 608 in these examples.

Foam 604 has structural members 612. In these illustrative examples, structural members 612 may be placed into foam 604 prior to being shaped for use in composite stringer 600. In other advantageous embodiments, foam 604 may be formed around structural members 612. Of course, in other advantageous embodiments, structural members 612 may be inserted into foam 604 after foam 604 has been shaped and is ready for composite material 602 to be laid up on foam 604. Typically, this type of lay up is used to manufacture a hat composite stringer, which is a stringer with acute angles in a trapezoidal shape.

Figure 7:
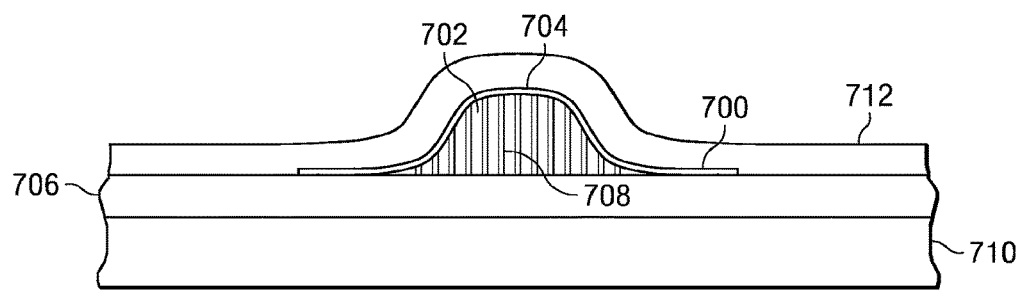
FIG. 7 is a diagram illustrating an example lay up of composite materials on an outside mold line tool for a composite stringer in accordance with an advantageous embodiment.

Turning now to FIG. 7, a diagram illustrating an example lay up of composite materials on an outside mold line tool for a composite stringer is depicted in accordance with an advantageous embodiment. In this example, composite stringer 700 includes foam 702 and composite material 704. Foam 702 is placed on fuselage skin 706. Composite material 704 is placed or laid up over foam 702 and fuselage skin 706. As in the other example, foam 702 includes structural members 708. These components form composite stringer 700 in a pre-cured state on outside mold line tool 710. In this example, bag 712 is placed over composite stringer 700 for curing composite stringer 700.

Figure 8:
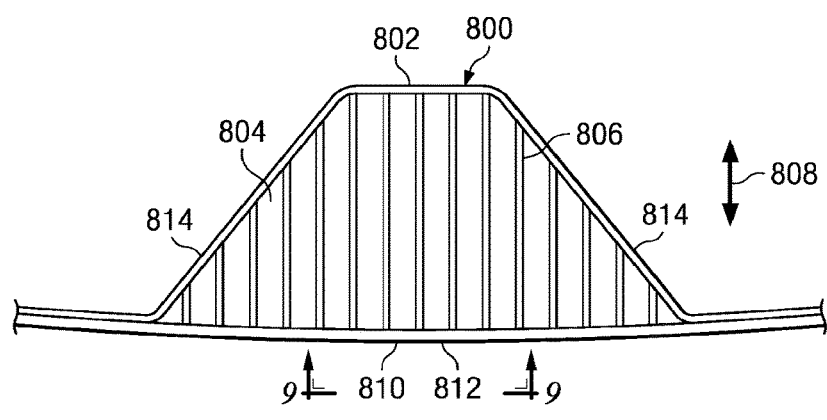
FIG. 8 is a cross-sectional view of a foam-filled stringer with structural members in accordance with an advantageous embodiment.

With reference now to FIG. 8, a cross-sectional view of a foam-filled stringer with structural members is depicted in accordance with an advantageous embodiment. In this example, composite stringer 800 has composite material 802, foam 804, and structural members 806. In this example, structural members 806 may take the form of pins having the same orientation in the direction of arrow 808. Structural members 806 may have an orientation to resist a number of loads. This number of loads may occur during curing of composite stringer 800.

Further, this resistance to loads also may be for loads that may be applied to composite stringer 800 after installation or attachment to another component. In this example, the number of orientations for structural members 806 is a single angle that is substantially normal to skin ply 810. In this example, structural members 806 may be around 90 degrees to surface 812 of skin ply 810.

Further, with the use of structural members 806, walls 814 of composite stringer 800 may be manufactured with less thickness. For example, one less ply of composite material may be used within walls 814. Structural members 806 provide a capability to resist a number of loads that may be applied to walls 814 of composite stringer 800.

Figure 9:
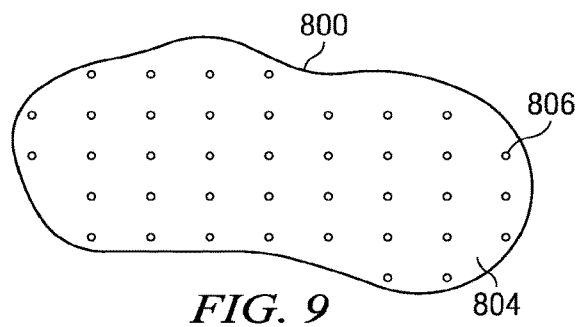
FIG. 9 is a diagram illustrating a cross-sectional view of a composite stringer in accordance with an advantageous embodiment.

With reference now to FIG. 9, a diagram illustrating a cross-sectional view of a composite stringer is depicted in accordance with an advantageous embodiment. In this example, a portion of composite stringer is taken along lines 9-9 in FIG. 8. In this view, a density for structural members 806 within foam 804 may be seen. Structural members 806 are distributed evenly within foam 804 in these examples. Of course, other types of distributions and densities may be used depending on the particular implementation.

Figure 10:
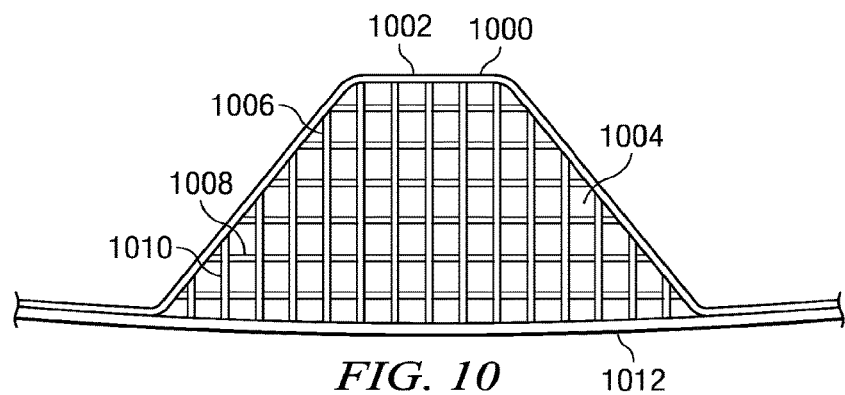
FIG. 10 is a diagram of a composite stringer in accordance with an advantageous embodiment.

With reference now to FIG. 10, a diagram of a composite stringer is depicted in accordance with an advantageous embodiment. In this example, composite stringer 1000 is formed from composite materials 1002, foam 1004, and structural members 1006. In this example, structural members 1006 may take the form of pins having a number of orientations. In this example, two orientations are present for structural members 1006. These orientations are perpendicular to each other and may form a three-dimensional grid-type structure.

Structural members 1006 have orientation 1008 and orientation 1010. Orientation 1008 is substantially parallel to skin ply 1012, while orientation 1010 is substantially perpendicular to skin ply 1012.

Figure 11:
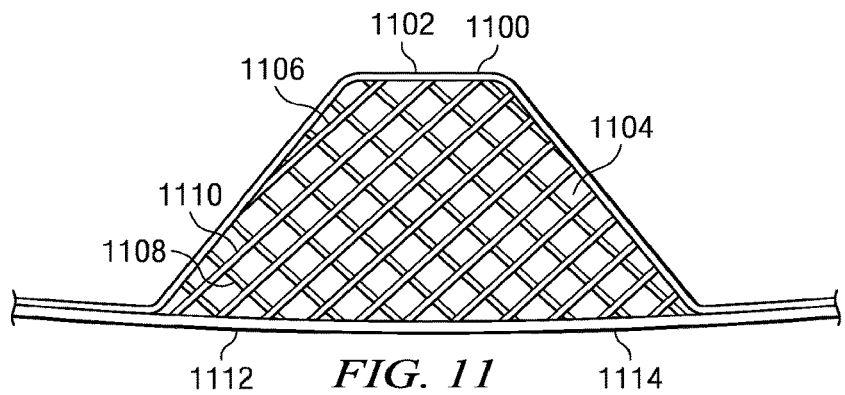
FIG. 11 is a diagram illustrating a composite stringer in accordance with an advantageous embodiment.

With reference now to FIG. 11, a diagram illustrating a composite stringer is depicted in accordance with an advantageous embodiment. In this illustrative example, composite stringer 1100 has composite materials 1102, foam 1104, and structural members 1106. Structural members 1106 have two orientations. Structural members 1106 have orientation 1108 and orientation 1110. These orientations are substantially perpendicular to each other but may have an angle of around 45 degrees and around 135 degrees to surface 1112 to skin ply 1114.

The illustrations of cross sections for composite stringers in FIGS. 8-11 have been provided for illustrating some configurations for composite stringers in accordance with advantageous embodiments. Of course, other configurations may be used depending on the particular implementation. For example, other numbers of orientations for structural members may be used. For example, three or four orientations may be used instead of one or two orientations for structural members.

For example, the measurement of the orientations for structural members may be based on other references than a skin ply or bottom surface for the composite stringer. Also, different densities for structural members may be employed. For example, densities for the structural members may be greater at areas of the composite stringer where greater loads may be anticipated for the composite stringer.

Figure 12:
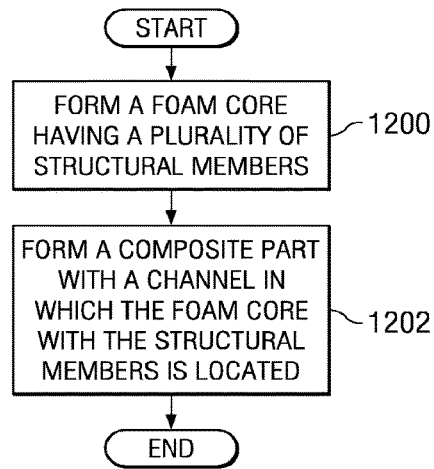
FIG. 12 is a flowchart of a process for manufacturing a composite part in accordance with an advantageous embodiment.

With reference now to FIG. 12, a flowchart of a process for manufacturing a composite part is depicted in accordance with an advantageous embodiment. The process illustrated in FIG. 12 may be implemented using the different tools illustrated in FIG. 5.

The process begins by forming a foam core having a plurality of structural members (operation 1200). The plurality of structural members has a number of orientations to resist a number of loads. The process then forms a composite part with a channel in which the foam core with the structural members is located (operation 1202), with the process terminating thereafter.

Figure 13:
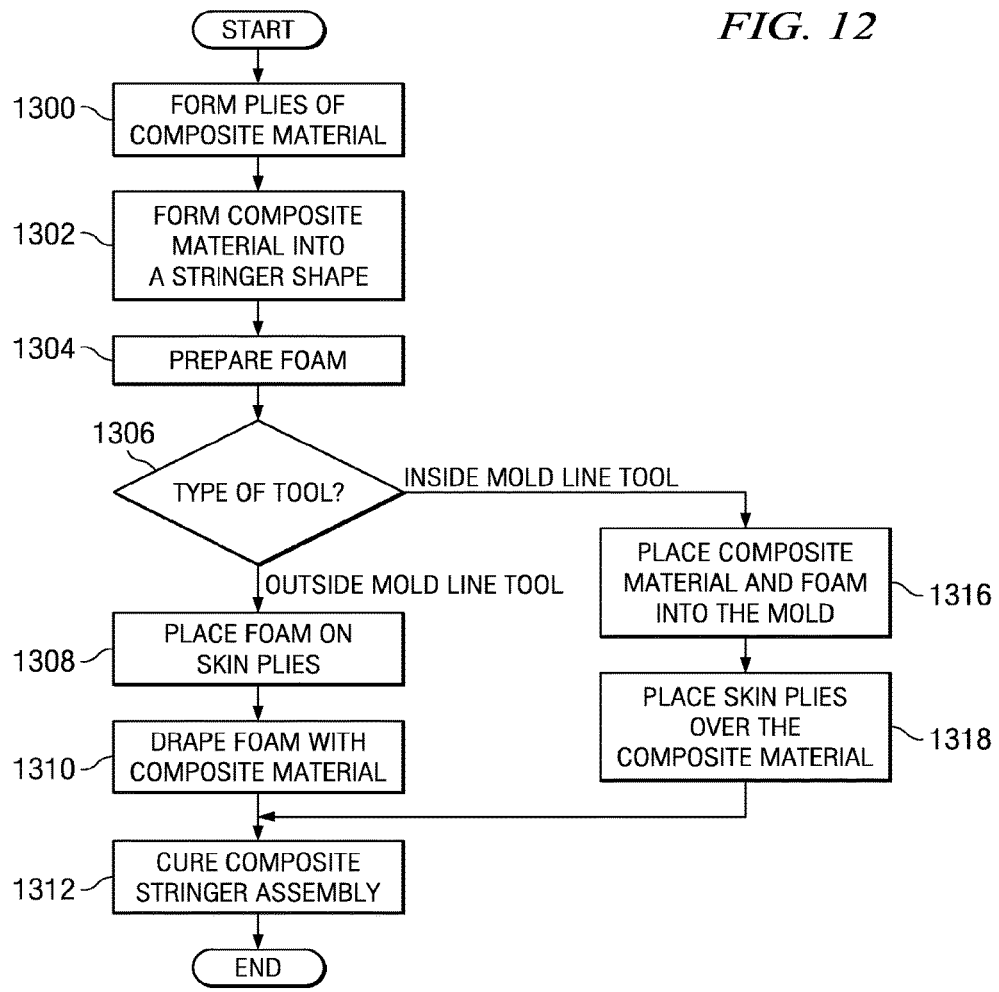
FIG. 13 is a flowchart of a process for manufacturing a composite stringer with a foam core in accordance with an advantageous embodiment.

Turning now to FIG. 13, a flowchart of a process for manufacturing a composite stringer with a foam core is depicted in accordance with an advantageous embodiment. The process illustrated in FIG. 13 may be implemented using tools depicted in FIG. 5.

The process begins by forming plies of composite material (operation 1300). This operation may involve cutting plies of composite tape and/or fabric, stacking the plies together, and vacuum compacting the composite material to form a flat charge. Thereafter, the composite material is formed into a stringer shape (operation 1302). Operation 1302 may involve using a dye or press to shape the flat charge into a stringer shape.

The process then prepares the foam with structural members (operation 1304). Operation 1304 may be used to create a foam core for the composite stringer. Structural members are placed into the foam in operation 1304. In other instances, the foam may be formed around the structural members.

Next, a determination is made as to the type of tool being used (operation 1306). If the tool is an outside mold line tool, the process places the foam onto skin plies (operation 1308). Thereafter, the foam is draped with the composite material (operation 1310).

The process then cures the composite stringer assembly (operation 1312). This curing operation also may include compacting the assembly with a vacuum in the autoclave/oven, with the process terminating thereafter.

With reference again to operation 1306, if the type of tool is an inside mold line tool, the process places the composite material and the foam into the mold (operation 1316). Next, the process places skin plies over the composite material (operation 1318), with the process then proceeding to operation 1312 as described above.

The composite stringer manufactured using this process may be used with various aircraft parts to provide for increased stiffening. Further, the composite stringer also may provide for noise and vibration dampening for various components. The composite stringer also may reduce and/or prevent liquids from travelling into the stringer or through the stringer.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

One or more of the different blocks also may represent operations performed by a human operator, tool, or some other suitable actor. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, in some advantageous embodiments, other blocks may be used in addition to the illustrative blocks, while some blocks may be optional.

Thus, the different advantageous embodiments provide a method and apparatus for forming composite parts. In the different advantageous embodiments, a foam core having a plurality of structural members is formed. This plurality of structural members has a number of orientations to resist a number of loads. The composite part is formed with a channel in which the foam core is located.

The composite stringer, in the different advantageous embodiments, may be manufactured using a lighter weight foam without having the foam collapse during a curing process. The use of structural members provides a resistance to a number of loads that may be applied during the curing process. As a result, the weight of composite stringers may be reduced through the use of lighter weight foams.

Further, with the different advantageous embodiments, the composite stringers may be capable of resisting loads that may be applied to the composite stringers during use. The composite stringers also provide a capability to block liquids as well as provide for sound and vibration dampening. Further, with the use of structural members, the thickness of the walls of the composite stringers may be made thinner to reduce the weight of the composite stringers.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of objects.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a composite material defining a channel;
a structure that comprises a skin ply connected to the composite material such that the skin ply retains a foam disposed in the channel; and
a plurality of pins in the foam and the composite material, such that the plurality of pins remain located completely between interior surfaces of the structure and arranged in a three dimensional grid that comprises:
a resistance to loads on the composite material;
a first set of pins, in the plurality of pins, that comprises a first orientation approximately 45 degrees offset relative to an orientation of the skin ply; and
a second set of pins in the plurality of pins, that comprises a second orientation approximately 135 degrees offset relative to the orientation of the skin ply.

2. The apparatus of claim 1, wherein the plurality of pins contact the composite material, and the loads on the composite material are compression loads.

3. The apparatus of claim 1, wherein the composite material is cured.

4. The apparatus of claim 1, wherein the plurality of pins extend from the skin ply to a first wall and a second wall of the channel.

5. The apparatus of claim 1, wherein the composite material comprises a hollow stringer of an aircraft.

6. The apparatus of claim 1, wherein the plurality of pins comprise a material selected from the group consisting of aluminum, steel, carbon, titanium, metal alloy, and ceramic material.

7. The apparatus of claim 1, wherein the foam comprises a material selected from the group consisting of polyisocyanurate, aromatic polyester, polyimide, styrene acrylo-nitrile, polymethacrylimide, polyetherimide, polyphenylene, polyetherether-ketone, polyvinylidene fluoride, and poly vinyl chloride.

8. The apparatus of claim 1, wherein the foam comprises a cellular polymer foam.

9. The apparatus of claim 1, wherein a pin in the plurality of pins is one of hollow or solid.

10. The apparatus of claim 1, wherein a pin in the plurality of pins comprises a shape selected from the group consisting of circular, square, rectangular, and triangular.

11. The apparatus of claim 1, further comprising a plurality of structural members, wherein the plurality of structural members comprise a third orientation, relative to the orientation of the skin ply, configured to resist a number of compression loads.

12. A noise attenuator that comprises:
a composite material formed into a hat shape, the composite material defining a channel;
a structure that comprises a skin ply connected to the composite material such that the skin ply retains a foam disposed in the channel; and
a plurality of pins in the foam, such that the plurality of pins remain located completely between interior surfaces of the structure and arranged in a three dimensional grid that comprises a first set of pins, in the plurality of pins, that comprises a first orientation, and a second set of pins in the plurality of pins, that comprises a second orientation, each orientation offset respectively relative to the orientation of the skin ply, such that the plurality of pins comprise a resistance to a load on the composite material.

13. The noise attenuator of claim 12, wherein the plurality of pins have a first density in a first area of the noise attenuator and a second density in a second area of the noise attenuator, the first density different from the second density.

14. The noise attenuator of claim 13, wherein the first area of the noise attenuator is subject to higher compression loads than the second area, and the first density is greater than the second density.

15. The noise attenuator of claim 12, wherein the plurality of pins extend from the skin ply to a first wall and a second wall of the channel.

16. A structure-that comprises:
a composite material that comprises a shape that comprises a channel;
a skin ply connected to the composite material and configured to retain a foam disposed in the channel; and
a plurality of tubes in the foam such that the plurality of tubes remain located completely between inside surfaces of the channel and arranged in a three dimensional grid that comprises a first set of tubes in the plurality of tubes, that comprises a first orientation and a second set of tubes in the plurality of tubes, that comprises a second orientation approximately normal to the first orientation, and each orientation offset respectively relative to the orientation of the skin ply, such that the plurality of tubes comprise a resistance to a load on the composite material.

17. The structure of claim 16, wherein the composite material, the foam, and the plurality of tubes comprise a first stringer and further comprising a second stringer connected to the skin ply.

18. The structure of claim 17, wherein the first stringer, the second stringer, and the skin ply comprise an aircraft panel.

19. The structure of claim 17, wherein the structure comprises a structural vibration dampener.

20. The structure of claim 17, wherein the structure comprises a noise attenuator.

* * * * *